United States Patent [19]

Sedlmayr et al.

[11] Patent Number: 4,627,639

[45] Date of Patent: Dec. 9, 1986

[54] SAFETY BELT SYSTEM

[75] Inventors: Gerhard Sedlmayr, Hamburg; Herbert Just, Honstorf, both of Fed. Rep. of Germany

[73] Assignee: Autoflug GmbH, Rellingen, Fed. Rep. of Germany

[21] Appl. No.: 706,639

[22] Filed: Feb. 28, 1985

[30] Foreign Application Priority Data

Feb. 29, 1984 [DE] Fed. Rep. of Germany ....... 3407377

[51] Int. Cl.$^4$ .................... B60R 22/48; A62B 22/20
[52] U.S. Cl. .................................................. 280/808
[58] Field of Search ............... 280/801, 806, 804, 808; 297/483, 486, 480

[56] References Cited

U.S. PATENT DOCUMENTS

| 2,771,128 | 11/1956 | Doolittle | 297/480 |
|---|---|---|---|
| 4,466,666 | 8/1984 | Takada | 280/808 |
| 4,491,343 | 1/1985 | Föhl | 280/801 |
| 4,511,097 | 4/1985 | Tsuge | 280/808 |
| 4,518,174 | 5/1985 | Sedlmayr | 280/808 |
| 4,547,717 | 10/1985 | Radermacher | 280/804 |

FOREIGN PATENT DOCUMENTS 3400115 7/1985 Fed. Rep. of Germany .

Primary Examiner—David M. Mitchell
Assistant Examiner—Karin L. Ferriter
Attorney, Agent, or Firm—Becker & Becker, Inc.

[57] ABSTRACT

A safety belt system, especially for motor vehicles. The system includes a three-point safety belt, a self-locking belt reel-in mechanism mounted on a structural part of the vehicle, and a clamping mechanism for the belt strap of the safety belt. The clamping mechanism has at least one movable clamping jaw, and is movably disposed and guided on the structural part. A drive mechanism is provided for effecting movement of the clamping mechanism. To better adapt the geometrical path of the safety belt system to the body proportions of a strapped-in occupant, to thereby more reliably prevent endangering forward movement of the body of the occupant, the clamping mechanism is disposed, along with its drive, in the structural part of the vehicle in such a way that they are vertically adjustable. For automatic vertical adjustment of the clamping mechanism, an arrangement is provided which senses the position of the belt strap relative to at least one parameter of its functional connection with a strapped-in person, and which undertakes a comparison, with a fixed desired value, of the actual value of the belt strap position as determined relative to the at least one parameter to ascertain whether a deviation exists between the two values. The sensing and value-comparison arrangement initiates a vertical adjustment of the clamping mechanism when the ascertained deviation continuously exceeds a designated deviation between the desired value and the actual value.

20 Claims, 5 Drawing Figures

SAFETY BELT SYSTEM

BACKGROUND OF THE INVENTION

1. Field of the Invention

The present invention relates to a safety belt system, especially for automobiles and other motor vehicles. The system has a three-point safety belt, a self-locking belt reel-in mechanism which is mounted on a structural part of the vehicle, as well as, for the belt strap, a clamping mechanism which is disposed on the structural part of the vehicle and has at least one movable clamping jaw; the clamping mechanism is movably guided on the structural part of the vehicle, and is provided with a drive mechanism for this movement.

2. Description of the Prior Art

With one such safety belt system of the aforementioned general type, a piston/cylinder unit which is driven by pressurized gas is provided as the drive mechanism for the movement of the clamping mechanism along the structural part of the vehicle. The propellant charge of this piston/cylinder unit is actuated by a sensor which is associated with the vehicle. In this arrangement, by means of an appropriately provided connection of the piston/cylinder unit with the actuating member for the clamping mechanism, there is also assured that the clamping action of the clamping mechanism is indirectly triggered by the sensor. Appropriate design of the piston/cylinder unit initially provides for actuation of the clamping action, and only after a period of time brings about the longitudinal movement of the clamping mechanism accompanied by tensioning of the belt strap. After termination of the tensioning process, the clamping mechanism catches in a locking housing, so that the belt strap is not released when someone pulls on it again at the same time that the gas pressure in the drive unit for the clamping mechanism is reduced.

The purpose of such a safety belt system is, while eliminating the belt slack at the body of the person who is strapped in, to at the same time reduce the belt extension to such an extent that it is almost impossible for the strapped-in person to move forward.

An advantage of this heretofore known safety belt system is that as a result of clamping the safety belt in the vicinity of the guide fitting, the belt length which is subsequently still available for a possible extension, is now only two-thirds of the overall length of the three-point safety belt, thereby eliminating a considerable portion of the belt extension. At the same time, however, the belt strap is tightened or tensioned due to the longitudinal movement of the clamping mechanism, and the belt slack at the body of the person is therefore eliminated, whereby the tensioning force is considerably closer to the guide fitting, so that the entire force for eliminating the belt slack is available.

An object of the present invention is to further improve the safety belt system of the aforementioned general type, and in particular such that a dangerous forward movement of the body of a person which is strapped in is even more reliably avoided by means of a better adaptation of the geometrical position of the safety belt system to the body proportions of the person who is strapped in.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
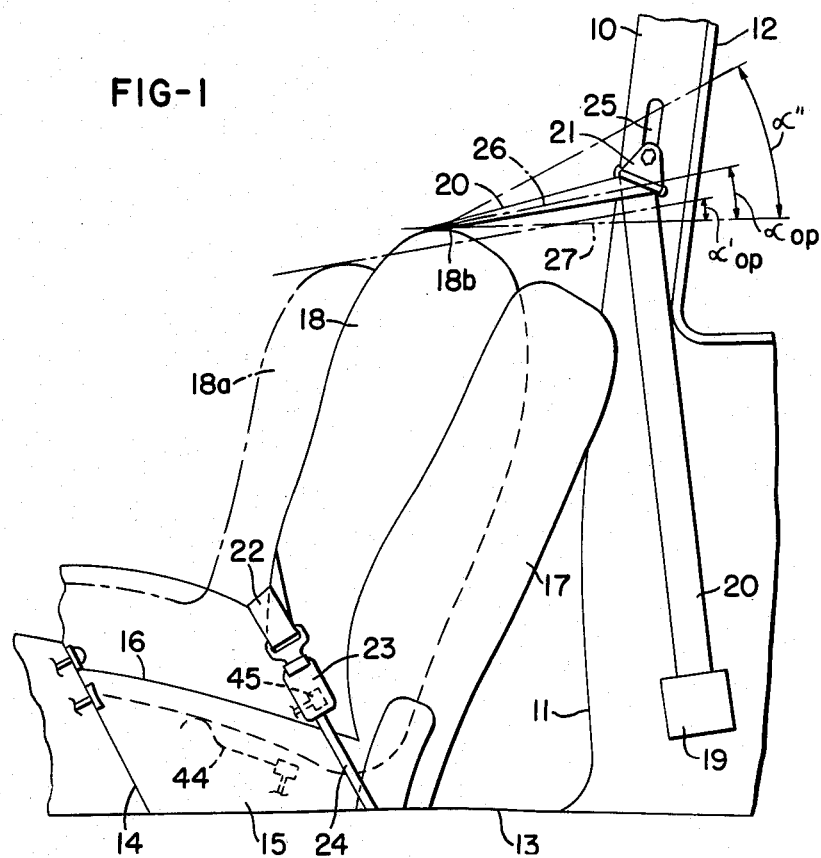
FIG. 1 is a schematic side view of one front seat of an automobile along with the associated B-column of the car body and one embodiment of the inventive safety belt system for use by the occupant of the seat.

The safety belt system of the present invention is characterized primarily in that the clamping mechanism, along with the drive mechanism, are disposed in the structural part of the vehicle in such a way as to be vertically adjustable; and in that, for automatic vertical adjustment of the clamping mechanism, an arrangement is provided which not only senses the position of the belt strap relative to at least one parameter of its functional connection with the strapped-in person, but also undertakes a comparison, with a fixed desired value, of the actual value determined relative to the selected parameter or parameters; the vertical adjustment is initiated when a predetermined deviation between the desired value and the actual value is continuously exceeded.

Pursuant to specific advantageous features of the present invention, connected to the structural part of the vehicle may be a U-shaped guide rail for receiving therein a guide fitting for the belt strap, the clamping mechanism, and the drive mechanism for the latter, with the guide rail thus effecting disposition of these components on the structural part. The guide rail may be provided with U-pieces which are bent inwardly toward one another in a C-shaped manner, and between which is formed an elongated slot. The guide rail may be mounted to the structural part of the vehicle by means of screws. A slide may be movably disposed in the guide rail, with the guide fitting and the clamping mechanism, along with its drive mechanism, being mounted on the slide. The slide may also be U-shaped in conformity to the shape of the guide rail, and may also be provided with U-pieces which are bent inwardly toward one another in a C-shaped manner, and between which is formed an elongated slot for guiding the belt strap. The U-pieces of the slide may be provided with laterally projecting bosses on both sides of the guide slot thereof. The guide rail is then provided with corresponding longitudinal grooves for guiding these bosses. The slide may be movable by means of a rack, which, in turn, is connected via a gear drive to a motor, which may be actuated by the sensing and value-comparison arrangement.

The parameter or parameters for the sensing and the initiation of the automatic vertical adjustment may be the force with which the belt strap rests upon the body, and especially the shoulder, of the person who is strapped in. The predetermined designated deviation between the desired value and the actual value may be set at a value of one-tenth of a Newton, so that only force deviations greater than this designated deviation lead to initiation of the vertical adjustment. The comparison of the actual value with the desired value may be effected at fixed time intervals. Detection of the actual values of the aforementioned parameter may also be affected at fixed time intervals. These time intervals may be, for example, thirty seconds. The vertical adjustment of the slide may be initiated in response to at least two deviations, of approximately the same magnitude, which are determined at time intervals relative to one another.

The sensing and value-comparison arrangement may be an electronic value-determining and computing unit. A displacement pick up may be connected in series ahead of an analog-digital converter, with the output of the converter, together with the output of a timing element ahead of and parallel to a computing unit, forming the input for this computing unit, which, in turn, emits a control signal. This control signal of the computing unit controls the adjusting motor for the slide.

An advantage of the present invention is that, due to the automatic vertical adjustment of the clamping mechanism along with its drive, the upper connection point, i.e. the guide fitting, for the shoulder strap of the safety belt system always taken as a whole conforms to the body proportions of the strapped-in person, even as a function from that person's seating position and the position of the seat in the vehicle. Thus, in every situation, the belt strap always follows an optimum path in the safety belt system. Therefore, the tensioning action of the clamping mechanism with its drive is also maximized in the event of an accident, since only when the belt follows the optimum path does the belt strap on the one hand have the least amount of slack at the body, and on the other hand is the best possible inward retraction of the belt strap provided via the guide fitting.

No. GB-A-21 10 921 discloses an arrangement whereby, after the person sitting in the vehicle seat has strapped himself in, a position value is determined which pertains to the direction in which the shoulder strap of the safety belt system assumes from its upper attachment or guide fitting to the shoulder, and hence to the body, of the strapped-in person. If in so doing it is discovered that the determined actual condition does not correspond to the recommended optimum, this condition is brought to the attention of the strapped-in person either by an appropriate signal, to which the person should react and appropriately correct the height of the upper attachment or guide fitting, or else the required vertical adjustment is fully automatically undertaken by appropriate means.

However, this heretofore known arrangement has the drawback that, due to the direct coupling of the actual condition determination and the automatically resulting adjustment of the fitting, the vertical adjustment immediately responds to all movements of the strapped-in person. All variations of the actual state of the path of the belt resulting even from only very slight or single movements of the strapped-in occupants of the vehicle are detected and are converted into appropriate automatic adjustments. As a result, this heretofore known fully automatic vertical adjustment arrangement constantly displaces the mounting in abrupt intervals, thereby adversely affecting the driver's concentration on the traffic.

Therefore, the solution proposed by the present invention has the particular advantage that the strapped-in occupant of the vehicle can move freely without such movement immediately being converted into appropriate signals or in automatic vertical adjustment of the clamping mechanism and the guide fitting. However, as soon as the occupant of the vehicle has altered his position, for example by moving the seat closer to or further away from the steering wheel or by changing the position of the backrest, to relieve his arms, and thus also brings about a deviation from the optimum path of the belt as determined for his normal seating position, this deviation is detected and is converted into an appropriate adjustment of the height of the clamping mechanism with its drive as well as of the guide fitting. The same is true if a different person having different body proportions gets into the vehicle and uses the safety belt system.

The concept of the permanent alteration of the seat position pursuant to the present invention is specifically fulfilled by the selection of the chronological detection of the actual value of the parameter selected for determining the optimum path of the belt. Thus, for example, a permanent alteration can be fixed by at least two deviations of nearly the same value between the desired value and the actual value, which deviations are determined at a time interval relative to one another, since from this condition it can be assumed that the strapped-in person has permanently altered his position in the seat. However, the determination of the values can also be effected continuously, with the reaction, i.e. the vertical adjustment, only being initiated after a constant deviation over a predetermined, freely selectable period of time.

Furthermore, the present invention precludes only slight deviations of the actual value from the desired value from leading to triggering or initiation of the vertical adjustment reaction, since deviations below a predetermined, designated, meaningful value are not even detected in a manner which is determinative for the screening or sensing process.

DESCRIPTION OF PREFERRED EMBODIMENTS

Referring now to the drawings in detail, Figure 1 shows an automobile body having a B-column 10, a front door opening 11, a rear side window 12, a floor 13, and a transmission cover 14. An individual front seat 15 having a seat area 16 and a backrest 17 is disposed in the vicinity of the door opening 11. Schematically illustrated as sitting on the seat 15 is a large person 18 or, in dot-dash lines, a small person 18a. Such a person is strapped in with a three-point safety belt which essentially comprises a belt reel-in mechanism 19, a shoulder belt or strap 20, a guide fitting 21, a lap belt 22, a belt buckle 23, and an anchoring member 24. Although the anchoring member 24 is inherently rigid, it is also flexible and is mounted to the seat 15. The seat can be adjusted in three ways.

The persons 18, 18a are illustrated very schematically without a head and neck, since the important thing is essentially only the position of the respective shoulder 18b which the shoulder strap 20 engages when it comes from the guide fitting 21, and from where it extends in the customary manner diagonally across the chest and stomach of the person to the tongue of the belt buckle 23, where the belt strap is turned around into the opposite direction and is guided as the lap belt 22 to the third mounting location. Since the guide fitting 21 on the B-column 10 is vertically adjustable in a slot-like guide 25, the belt strap of the shoulder strap 20 can extend in a more or less inclined direction from the guide fitting 21 to the shoulder 18b of the person sitting in the seat 15. The inclined position is defined in the drawing as the angle alpha, which the center line or central longitudinal axis 26 of the tightly tensioned shoulder strap 20 forms with an associated horizontal line 27. This angle alpha, at least theoretically, has an optimum magnitude ($\alpha_{op}$) for each body size in connection with each seat position.

As shown in FIG. 1, the guide fitting 21 is adjusted to such a height that the shoulder strap 20 engages the shoulder 18b of the large person 18 at the optimum belt angle $\alpha_{op}$. For the small person 18a, the optimum belt angle $\alpha'_{op}$ *would be the same as for the large person* 18, *although the guide fitting* 21 *would have to be adjusted lower in the guide* 25. *The other belt angle* $\alpha''$ *shown in FIG.* 1 *is too large, and is therefore unfavorable and should be rejected for safety reasons. To determine the optimum belt angle, i.e. for determination of the actual state of the belt angle* $\alpha$ *and for possibly necessary correction until the optimum angle* $\alpha_{op}$ *is* achieved as the desired state, a scanning and sensing arrangement is provided and will be described in detail subsequently in connection with FIGS. 2a and 2b.

Figure 2A:
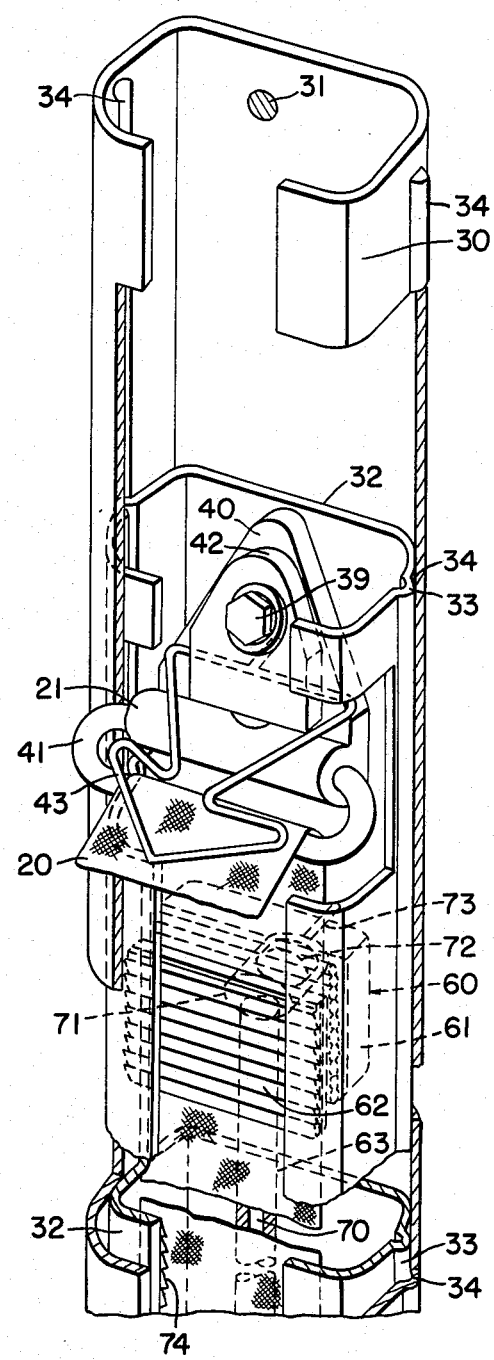
FIGS. 2a and 2b are schematic views of the vertically adjustable clamping mechanism, along with its drive, of the inventive safety belt system.
Figure 2B:
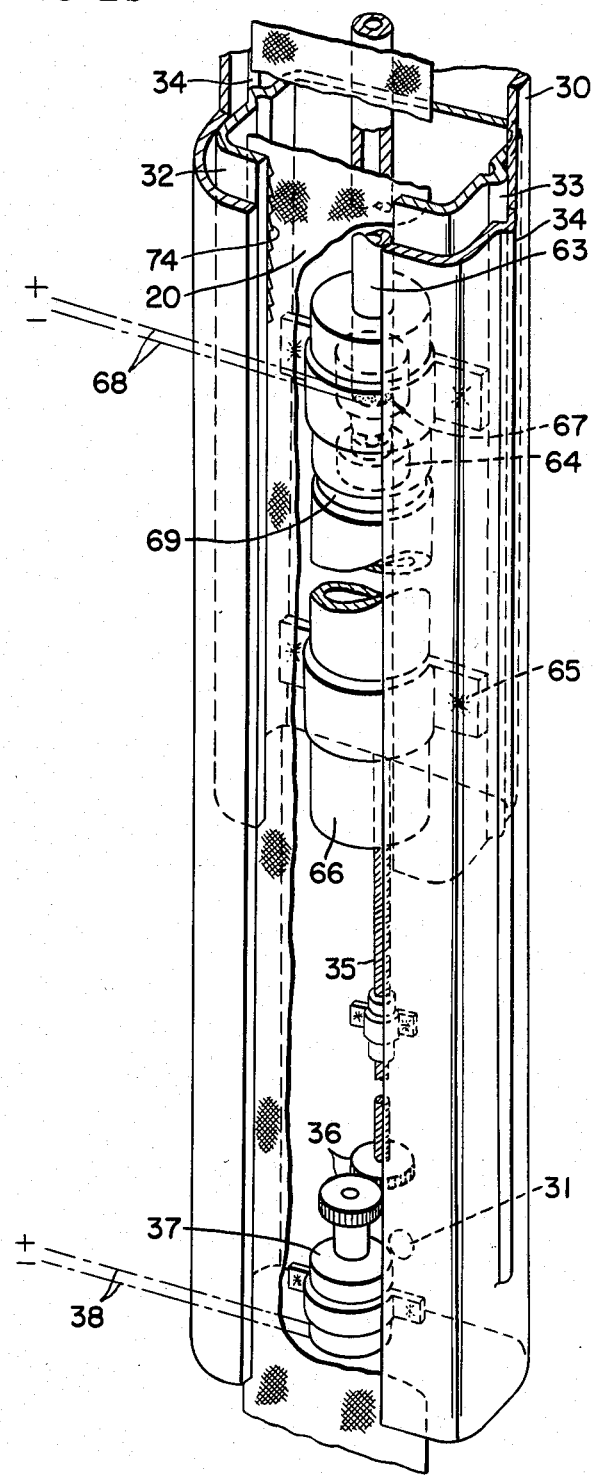

As shown in FIGS. 2a and 2b, a guide rail 30 is provided for the mounting of the vertically adjustable clamping mechanism, which is provided with a drive and the guide fitting 21; the rail 30 can be mounted on the B-column 10 of the vehicle by means of mounting screws 31. The rail 30 is U-shaped, and has U-pieces which are bent inwardly in the manner of a C, so that there is provided between the ends of the bent U-pieces the previously mentioned slot-like guide 25 for adjusting the height of the unit.

A slide 32, to which said guide fitting 21 is connected, is disposed in the U-rail 30 in such a way as to be movable in the longitudinal direction of the rail. The slide 32 has a shape which conforms to that of the rail 30, so that when the slide 32 is placed within the rail 30, these components can move relative to one another without the slide 32 being able to move out of the rail 30; the slide 32 is prevented from doing so by the C-shaped bends of the U-pieces of the rail 30. The slide 32, in turn, is also provided with U-pieces which are bent in the manner of a C, so that a form-fitting connection is provided between the slide 32 and the rail 30. Furthermore, the slide 32 is provided on both sides with outwardly directed bosses 33 on its U-pieces. The bosses 33 are guided in longitudinally oriented grooves 34 on the insides of the U-pieces of the rail 30, thus imparting an additional guide stability to the slide 32.

Fastened to the lower end of the slide 32 is a rack 35, which is connected via a gear drive 36 to an electric motor 37, which is supplied with power via electrical-supply lines 38.

Mounted on the longitudinal extension of the slide 32 is the movable clamping mechanism 60, which is designed in conformity to the embodiment described in applicant's co-pending U.S. patent application Ser. No. 688,843, filed Jan. 4, 1985. The clamping jaws 61, 62, which are disposed on both sides of the belt strap 20, are furthermore disposed at the upper end of a piston rod 63, at the other end of which is located a piston 64 which, in turn, is guided within a guide tube 66 which is mounted on the slide 32 by means of brackets 65. The length of the piston rod 63, i.e. the distance between the clamping mechanism 60 and the guide tube 66, is determined by the amount of belt tensioning or tightening which is desired.

A propellant charge 67 is disposed in the region between the upper end of the guide tube 66 and that position of the piston 64 determined by the rest position of the latter. The propellant charge 67 is connected via lines 68 with a sensor which is associated with the vehicle and triggers the charge 67. The guide tube 66 is furthermore provided with a reduced diameter section 69 below the piston 64.

The piston rod 63 is provided with a central longitudinal bore 70, and is also provided at its lower end where is it connected to the piston 64 with transverse bores. At the upper end of the piston rod 63, the longitudinal bore 70 opens into a piston chamber 71 provided in the clamping mechanism 60. The movable clamping jaw is seated at the front end of a piston 72, which is movably guided in the piston chamber 71. On that side facing away from the movable clamping jaw, a piston rod 73 of the piston 72 projects out of the clamping mechanism 60.

So that the clamping mechanism cannot move upwardly again after it has been triggered and moved downwardly accompanied by the action of the tensioning force which is exerted upon the belt strand, the slide 32 is provided with serrations or teeth 74 in that region thereof which comes into contact with the clamping jaws 61, 62. These jaws move into the teeth 74, where they are arrested and held.

The operation of this clamping mechanism, which takes place in the event of an accident independent of the inventive vertical adjustment of the clamping mechanism in the B-column as a function of the body size of the person strapped in, is described as follows: As a result of the ignition of the propellant charge 67, which is triggered by the sensor associated with the vehicle in the event of an accident, the resulting pressurized gas expands and initially enters the transverse bores at the lower end of the piston rod 63, since the piston 64 cannot yet be moved downwardly due to its being fixed by the reduced diameter section 69 in the guide tube 66. A further protection against a downward movement of the piston rod 63, and hence of the clamping mechanism 60, is provided by the piston rod 73 of the piston 72, whereby piston rod 73 projects out of the clamping mechanism 60 in the open condition of the latter; the free end of the piston rod 73 engages an element which is rigidly connected to the vehicle.

The pressurized gas is conveyed via the transverse bores and the longitudinal bore 70 in the piston rod 63 into the piston chamber 71 in the clamping mechanism 60, where it presses the piston 72 along with the movable clamping jaw in the direction toward the stationary clamping jaw. At the same time, the piston rod 73 moves out of the element which is rigidly connected to the vehicle, and becomes flush with the inside of the guide rail. After the movement of the piston 72 has been terminated, the gas which continues to flow builds up such a pressure that subsequently the piston 64 is driven downwardly thereby past the reduced diameter section 69 in the guide tubes 66 to its end position. In this manner, the clamping mechanism 60, along with the clamped-in belt strand, is moved downwardly until the clamping mechanism catches on the teeth 74 in the slide 32, thus tightening or tensioning the belt strap. The teeth 74 operate in such a way that the clamping mechanism 60 is held in its clamped end position therein even after the gas pressure drops.

Figure 2C:
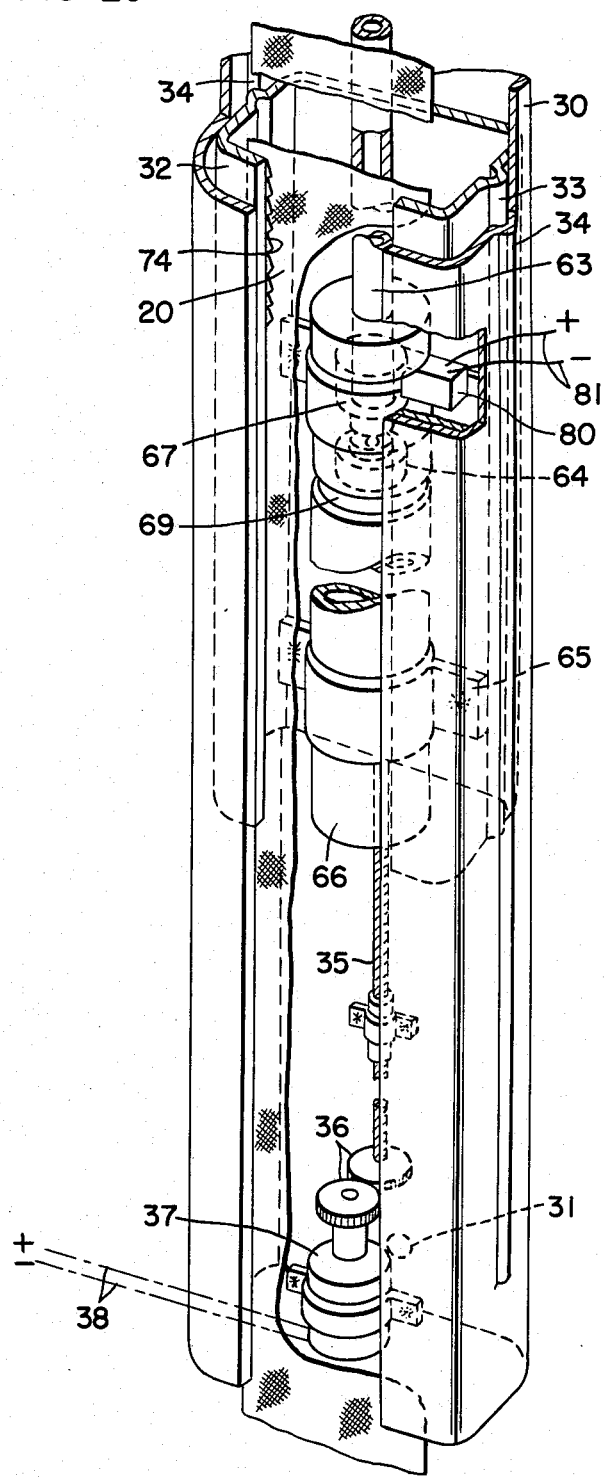
FIG. 2c shows another embodiment of the clamping mechanism of FIG. 2b.

As can be seen from the preferred inventive embodiment illustrated in FIG. 2c, a connection of the propellant charge 67 with the central vehicle sensor is dispensed with. Instead, the propellant charge 67 is now associated directly with a suitable sensor 80, which is connected via lines 81 to the electrical system of the vehicle, so that the unit 67, 80 is supplied with power. The advantage of this proposal is that, starting from the main vehicle sensor of the entire vehicle, it is no longer necessary to have separate signal cables connecting the respective propellant charges 67 of the various safety belt systems to the various vehicle seats. After all, as the number of vehicle seat safety belt systems increases, the structure of the main vehicle sensor also becomes very complicated and expensive, since it must be designed and conditioned in conformity therewith.

The advantage offered by the decentralized association of a sensor 80 with each drive 67, as provided pursuant to the embodiment of FIG. 2c, is that the sensor 80 itself can be kept smaller and cheaper, being, for example, in the form of a microchip, since each sensor 80 only has to trigger a single propellant charge 67. A further advantage, with regard to the triggering of the propellant charge 67, is that each sensor 80 can be conditioned with time delays calculated precisely in conformity with its position in the vehicle. This affords greater precision and reliability when the clamping mechanism 60 is triggered.

A portion of the inventive arrangment for automatic vertical adjustment of the clamping mechanism 60 by means of the movement of the slide 32 in the U-rail 30 which is mounted on the B-column 10 of the automobile is provided at the upper end of the slide 32. At this location, the guide fitting 21 is connected to the slide 32 by means of a bolt 39. The guide fitting 21 comprises a bracket 40, and a loop 41 for the shoulder strap 20 which is guided therethrough. Disposed on the outer side of the bracket 40 is a hood 42 which on the one hand serves for pivotable mounting of a sensing or contact element 43, which can, for example, be bent out of wire or made of plastic, and on the other hand serves for accommodating a non-illustrated pressure gauge which is acted upon by a similarly non-illustrated angular bend of the contact element 43. The contact element 43 is furthermore shaped like an arrow, and in particular is shaped in such a way that it embraces the belt strap of the shoulder strap 20 from above and below, so that even very small variations of the tension of the belt strap can be detected and transmitted to the pressure gauge. In this arrangement, the contact element 43 essentially also reacts to the direction between the guide fitting 21 and the shoulder 18b of the person who is strapped in. However, the arrangement must be calibrated for the pressure which the belt strap perceptibly exerts due to its position on the body of the person. The pressure gauge then also signals the false belt angle, so that the contact pressure of the belt on the person can be utilized as a parameter for determining the actual value of the position of the belt.

Figure 3:
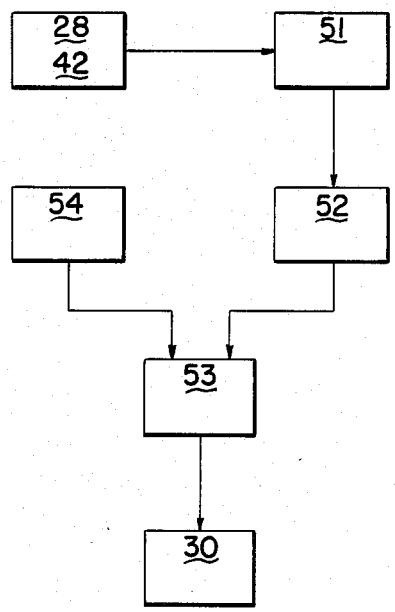
FIG. 3 is a block diagram showing the arrangement for comparing the desired and actual values of the belt position.

The conversion of the aforementioned variation of the actual position of the belt from the optimum position of the belt, which variation is detected by the sensing or contact device, into an appropriate vertical adjustment of the slide 32 along with the clamping mechanism 60 disposed thereon by means of the motor 37 is carried out in an electronic value-determining and computing unit 50, which is illustrated as a block diagram in FIG. 3, and can, for example, even be disposed on the motor 37. The variations of the pressure gauge mounted at the guide fitting 21 are inductively detected by a displacement pick up 51, as a result of which the actual value detection of the parameter is undertaken. Connected to the output side of the displacement pick up 51 is an analog-digital converter 52 in which the analog value detected by the pick up 51 is digitalized for use in the computing unit.

The output value of the analog-digital converter 52 is conveyed as the input value to a computing unit 53 in which are stored not only the desired value for that belt angle which is considered optimum, but also the permissible variations or deviations therefrom. A further input to the computing unit 53 is the pulse of a timing element 54 which, for example, can comprise a crystal and every thirty seconds emits a pulse which is conveyed to the computing unit 53. It should be noted that this value of the time interval of the pulses is only given by way of example. In other words, this interval can either be increased or decreased without thereby affecting the fundamental concept of the invention. Every time that a pulse from the timing element 54 is input into the computing unit 53, there takes place in the latter a comparison between the stored desired value and the actual values which are constantly being input from the analog-digital converter 52.

It is also possible to have an embodiment where the timing element 54 is connected to the displacement pick up 51, so that even the actual value detection is effected in a periodic rhythm controlled by the timing element 54.

As soon as the computing unit 53 registers that the permissible deviation input into it between the desired and actual values is continuously being exceeded, which registration is in the form of at least two successive comparison values which are above the stored deviation, the computing unit 53 delivers control signals to the motor 37 for the movement of the slide 32 in the rail 30. The control signals are in such a form that on the one hand they effect a rotation of the motor to the left and right to adjust the height of the slide 32 upwardly or downwardly, and that on the other hand they also fix the value of the movement of the motor and hence of the vertical adjustment of the slide 32. This latter can be achieved by graduating the control signals into so-called jump signals, whereby, for example, one digital jump effects one rotation of the motor 37, so that depending upon the value of the deviation determined between the desired value and the actual value, an appropriate number of jump signals are given off by the computing unit 53 to the motor 37.

To switch off the adjusting action of the valuedetermining and computing unit 50 during the time in which the safety belt is not being used, i.e. in particular when no person is in the seat 15, it is possible, for example, to provide a seat area contact switch 44, or even a switch 45 which is built into the belt buckle 23; both of these switches can also be connected with a light or sound signal which is provided to urge one to put on the safety belt. However, it is also possible, by an appropriate shaping of the contact element 43, to bring about a disconnection of the latter from the pressure gauge when the belt strap of the shoulder strap 20, under the action of the belt reel-in mechanism 19 on the B-column 10, extends straight down.

The present invention is, of course, in no way restricted to the specific disclosure of the specification and drawings, but also encompasses any modifications within the scope of the appended claims.

What we claim is:

1. A safety belt system, especially for motor vehicles, which includes a three-point safety belt, a self-locking belt reel-in mechanism mounted on a structural part of said vehicle, and a clamping mechanism for the belt strap of said safety belt; said clamping mechanism having at least one movable clamping jaw, and being movably disposed and guided on said structural part, with a drive mechanism being provided for effecting movement of said at least one clamping jaw of said clamping mechanism;

the improvement therewith wherein said clamping mechanism, adjustable to change adaptive positioning of said safety belt for strapping-in of a person; and wherein, for automatic vertical adjustment of said clamping mechanism, a value-determining and computing unit is provided which senses the position of said belt strap relative to at least one parameter of its functional connection with a strapped-in person, and which undertakes a comparison, with reference to a fixed desired value and the actual value of said belt strap position as determined relative to said at least one parameter to ascertain whether a deviation exists between said two values; said value-determining and computing unit, via an adjusting mechanism, accordingly having an operative relationship that initiates a vertical adjustment of said clamping mechanism when said ascertained deviation continuously exceeds a designated deviation between said desired value and said actual value.

2. A safety belt system according to claim 1, which includes, connected to said structural part of said vehicle, a U-shaped guide rail for receiving therein a guide fitting for said belt strap, said clamping mechanism, and said drive mechanism, said guide rail thus effecting disposition of said last-mentioned components on said structural part; said guide rail being provided with U-pieces which are bent inwardly toward one another in a C-shaped manner, and between which is formed an elongated slot.

3. A safety belt system according to claim 2, in which screws are provided for mounting said guide rail to said structural part of said vehicle.

4. A safety belt system according to claim 2, which includes a slide, which is movably disposed in said U-shaped guide rail and on which are mounted said guide fitting, and said clamping mechanism along with its drive mechanism.

5. A safety belt system according to claim 4, in which said slide is U-shaped in conformity to the shape of said guide rail, and is also provided with U-pieces which are bent inwardly toward one another in a C-shaped manner, and between which is formed an elongated slot for guiding said belt strap.

6. A safety belt system according to claim 5, in which said U-pieces of said slide are provided with laterally projecting bosses on both sides of said elongated guide slot thereof, with said guide rail being provided with corresponding longitudinal grooves for guiding said bosses.

7. A safety belt system according to claim 5, in which said adjusting mechanism includes a motor, a drive gear operatively connected to said motor, and a rack which is connected to said drive gear and to said slide for moving the latter to thus effect said vertical adjustment of said clamping mechanism.

8. A safety belt system according to claim 7, in which said motor is actuatable by said value-determining and computing unit.

9. A safety belt system according to claim 7, in which said at least one parameter for said sensing and said initiation of said automatic vertical adjustment is the force with which said belt strap rests upon the body of the strapped-in person.

10. A safety belt system according to claim 9, in which said designated deviation between said desired value and said actual value is set at a value of one tenth of a Newton, so that only force deviations greater than this designated deviation lead to initiation of said vertical adjustment.

11. A safety belt system according to claim 9, in which said comparison of said actual value with said desired value is effected at fixed time intervals.

12. A safety belt system according to claim 11, in which said fixed time interval is thirty seconds.

13. A safety betl system according to claim 9, in which said sensing of said actual value of said at least one position parameter is effected at fixed time intervals.

14. A safety belt system according to claim 13, in which said fixed time interval is thirty seconds.

15. A safety belt system according to claim 9, in which movement of said slide, and hence vertical adjustment of said clamping mechanism, is initiated in response to at least two deviations, of approximately the same magnitude, which are determined at time intervals to one another.

16. A safety belt system according to claim 9, in which said value-determining and computing unit is an electronic unit.

17. A safety belt system according to claim 16, in which said value-determining and computing unit includes a displacement pick up for receiving the value of said sensor at least one position parameter, an analog-digital converter connected in series with said pick up, a computing unit, and a timing element, with said timing element and said analog-digital converter being connected, in parallel, to and ahead of said computing unit, with the outputs of said timing element and said analog-digital converter together forming the input for said computing unit, which in turn emits a control signal for effecting said vertical adjustment of said clamping mechanism.

18. A safety belt system according to claim 17, in which said control signal of said computing unit controls said motor of said slide to move the latter and thus effect said vertical adjustment of said clamping mechanism.

19. A safety belt system according to claim 4, which includes, in an associated one of said slides, a separate sensor for each drive mechansim of each clamping mechanism, with each sensor being coupled via lines to an energy supply system for said vehicle.

20. A safety belt system according to claim 19, in which each sensor and its drive mechanism are a unit, with each sensor being conditioned for appropriate time delay in conformity with its position in said vehicle.

* * * * *